United States Patent [19]

Tilley et al.

[11] Patent Number: 4,910,105

[45] Date of Patent: Mar. 20, 1990

[54] ELECTROCHEMICAL CELL

[75] Inventors: Alec R. Tilley, Mugginton, Nr Weston; Diane Rowe, Littleover, both of England

[73] Assignee: Lilliwyte Societe Anonyme, Girondins, Luxembourg

[21] Appl. No.: 278,117

[22] Filed: Nov. 30, 1988

[30] Foreign Application Priority Data

Dec. 4, 1987 [GB] United Kingdom ................ 8728394

[51] Int. Cl.[4] .......................................... H01M 12/39
[52] U.S. Cl. ..................................... 429/103; 429/104
[58] Field of Search ................................ 429/103, 104

[56] References Cited

U.S. PATENT DOCUMENTS

| 4,220,691 | 9/1980 | Roth et al. ........................ 429/104 |
| 4,348,467 | 9/1982 | Wright ............................. 429/104 X |
| 4,446,213 | 5/1984 | Steinleitner ....................... 429/104 |
| 4,515,874 | 5/1985 | Steinleitner ....................... 429/104 |
| 4,568,620 | 2/1986 | Wright et al. ...................... 429/104 |

FOREIGN PATENT DOCUMENTS

| 1461071 | 1/1977 | United Kingdom . |
| 1491929 | 11/1977 | United Kingdom . |
| 1555133 | 11/1979 | United Kingdom . |
| 1569114 | 6/1980 | United Kingdom . |
| 2067005A | 7/1981 | United Kingdom . |
| 2080608A | 2/1982 | United Kingdom . |
| 2089559A | 6/1982 | United Kingdom . |
| 2140608A | 11/1984 | United Kingdom . |
| 2162680 | 2/1986 | United Kingdom . |
| 2132003 | 5/1986 | United Kingdom . |
| 2182194A | 5/1987 | United Kingdom . |
| 2195329A | 4/1988 | United Kingdom . |

OTHER PUBLICATIONS

Pompon et al., "Sodium-Sulfur Accumulators for Energy Storage", Comm. European Communities Report No. EUR 4236, vol. 2, at 174-183 (1984).

Primary Examiner—Stephen J. Kalafut
Attorney, Agent, or Firm—Arnold, White & Durkee

[57] ABSTRACT

The invention provides a high temperature rechargeable electrochemical power storage cell which comprises an alkali metal anode which is molten at the operating temperature of the cell. The cell has a cathode and a separator which separates the anode from the cathode and which is a conductor of ions of the metal of the anode. The surface of the separator which is exposed to the anode is at least partly enclosed by and in contact with a layer of particulate material which acts as a wick for the molten alkali metal of the anode. The material of the particles of the layer is electronically conductive and chemically inert at the operating temperatures of the cell to the alkali metal of the anode and to the separator, and the particles thereof are coated by a surface coating. The alkali metal of the anode, when molten, exhibits a contact angle with respect to said coating which is less than the contact angle exhibited by the molten alkali metal with respect to the material of the particles which underlies their coatings.

11 Claims, 6 Drawing Sheets

ELECTROCHEMICAL CELL

This invention relates to a high temperature rechargeable electrochemical cell. More particularly it relates to a high temperature rechargeable electrochemical cell comprising a molten alkali metal anode, a cathode and a ceramic solid electrolyte separator which separates the anode from the cathode; to a cell subassembly for such cell; and to a separator for such cell.

According to the invention there is provided a high temperature rechargeable electrochemical power storage cell which comprises an alkali metal anode which is molten at the operating temperature of the cell, a cathode and separator which separates the anode from the cathode and which is a conductor of ions of the metal of the anode, the surface of the separator which is exposed to the anode being at least partly enclosed by and in contact with a layer of particulate material which acts as a wick for the molten alkali metal of the anode, the material of the particles of the layer being electronically conductrive and chemically inert at the cell operating temperatures to the alkali metal of the anode and to the separator, and the particles thereof being coated by a surface coating, the alkali metal of the anode when molten exhibiting a contact angle with respect to said coating which is less than the contact angle exhibited by the molten alkali metal with respect to the material of the particles which underlies their coatings. The separator may be tubular, the anode being located outside the tube, and the layer of particulate material being in the form of a layer of powder held in position against the tube by a porous sleeve. In this case, the cathode will be inside the tube and the anode will be located between the tube and a cell housing or casing. The porous sleeve may be of eg aluminium or steel, enclosing and spaced radially from the tube. Instead, the sleeve may be non-porous, the annular space between the sleeve and the tube which holds the layer of particulate material being closed off at at least one end thereof, eg an end thereof which in use is its lower end, by a porous plug. The anode may instead be located inside the tube, the cathode being located between the tube and a cell housing or casing.

The layer will typically have a thickness of about 0,5–2 mm, eg 1 mm, the material having an average particle size in the range 2–400 microns. The material of the particles underlying their coatings may be a member of the group consisting of metals which are more noble than the alkali metal of the anode, graphite, silicon carbide and mixtures thereof. The material may thus be metallic, eg iron or nickel, or it may be non-metallic, such as carbon (graphite) or said silicon carbide. The average particle size of the powder can be selected to provide suitable wicking properties, bearing in mind that a powder with a larger particle size is more easily penetrated and saturated by the molten alkali metal of the anode, whereas a powder with a smaller particle size can wick the molten alkali metal to a greater height against gravity by capillary action. Preferably, the particle size distribution of the powder is reproducible for reproducible results, and this can be promoted by using relatively mono-sized powders.

The coating with respect to which the molten alkali metal of the anode exhibits the above low contact angle, which angle is preferably less than 10°, may be a metal oxide, such as transition metal oxide. Thus, the coating may be a metal oxide selected from the group consisting of the oxides of lead, tin, zinc, copper, iron, nickel, manganese and mixtures thereof. Such oxide may be obtained by wetting the powder with a solution containing a salt of the metal in question, and oxidizing the salt, eg by hydrolysing it, heating it in an oxidizing atmosphere to decompose it to the oxide, or the like. The concentration of the solution will be such as to provide a desired or a sufficient surface density of oxide sites on the powder particle surfaces for adequate wetting.

In certain cases an oxide layer may be obtained which is reduced by the alkali metal of the anode. Thus, if eg lead, tin or zinc aqueous acetate solutions are used to wet the powder, and are heated to decompose them to the oxides, this will lead to coatings of lead, tin or zinc oxide on the particles. These oxides are reduced to the corresponding metals by the alkali metal of the anode and such metal, in the case eg of sodium, can form an alloy with and eventually dissolve in the alkali metal of the anode. Such oxide coatings, while initiallly satisfactory, may thus possibly suffer from the long-term disadvantage that the wettability of the powder arising from the coating, reduces progressively as the coating oxide is reduced and the reduced metal is leached from the surface of the powder by the alkali metal of the anode.

In other cases eg when coatings of oxides of certain transition metals such as iron, copper or nickel are formed on the powder, for example by treating the powders with solutions of the chlorides of these metals in absolute ethanol followed by heating in air to evaporate the solvent and hydrolyse the chloride, an oxide is also obtained which will be eventually reduced to the transition metal by the alkali metal of the anode. If the anode metal is sodium, these metals are not however soluble therein and remain coated on the powder particles to assist in wetting for relatively extended periods. Surprisingly, if iron is provided with an iron oxide coating, or a nickel powder is provided with a nickel oxide coating in this fashion, enhanced long term wettability of the powder is achieved, even after reduction of the oxide by sodium anode material, and this is believed to arise possibly from initial conditioning of the particle surfaces by the oxide to provide an altered and more easily wettable surface structure. The coating may thus be a metal coating formed on the particles by reduction of a metal oxide coating on the particles by the alkali metal of the anode.

In yet other cases, certian transition metal oxide coatings may be employed which are not reduced by the alkali metal of the anode, and which instead form a mixed oxide coating with the oxide of the alkali metal anode material. Thus, for example, manganese nitrate solution in water can be used to wet the powder, and heated to decompose it to the oxide. In use, on contact, eg with sodium anode material, a mixed manganese oxide/sodium oxide coating is formed on the powder, which is relatively easily wettable by the sodium of the anode. Instead, the powder can be wetted with an aqueous paint or slurry containing a mixed oxide of, eg manganese oxide and sodium oxide, and dried to form such coating.

When oxide coatings are used a described above for the powder, the cell may contain, in contact with or dissolved in the alkali metal of the anode, a getter selected from the group consisting of aluminium, titanium, vanadium, magnesium and mixtures thereof, eg in powder, foil or dissolved form, for gettering impurities such as any oxygen, water, hydronium ions or the like released at the separator/anode metal interface during charge/discharge cycling or the cell, and possibly arising also from the coating employed on the powder.

The separator is typically a ceramic solid electrolyte which is a conductor of the metal of the anode in ionic form, such as the sodium ion conductors which include beta-alumina, nasicon or the like.

Typically, as indicated above, the alkali metal of the anode may be sodium and the separator will be beta-alumina, eg in the form of a beta-alumina tube.

Any suitable cathode, compatible with the anode and separator employed, eg molten sulphur/alkali metal sulphide-polysulphide or transition metal/transition metal chloride, may be used in the cell. Thus, for example, the cathode may have, as its active cathode substance, a substance selected from molten sulphur/sodium sulphide/polysulphide and members of the group consisting of $Fe/FeCl_2$, $Ni/NiCl_2$, $Co/CoCl_2$, $Cr/CrCl_2$ and $Mn/MnCl_2$, immersed in an $NaAlCl_4$ molten salt liquid electrolyte in contact with the separator and in which the mole ratio of Al:Na ions is at most 1:1. This electrolyte is thus a sodium aluminium chloride which is stoichiometric $NaAlCl_4$ (for a sodium anode). For alkali metal nodes in general, the molten salt electrolyte is preferably an equimolar mix of aluminium halide and alkali metal halide in contact with the lakali metal halide in solid form. The active transition metal/transition metal chloride cathode substances may be dispersed in a macroscopically porous electronically conductive matrix which acts as a current collector and is permeable to and impregnated by the molten salt electrolyte in liquid form.

The invention extends to a cell sub-assembly for a high temperatue rechargeable electrochemical power storage cell, which comprises a cell housing and a separator which divides the housing into an anode compartment and a cathode compartment, the separator being a conductor of alkali metal ions having, on its surface exposed to the anode compartment, a layer of particulate material which is electronically conductive and chemically inert to alkali metals and to the separator, and the particles thereof being coated by a surface coating, alkali metals when molten exhibiting a contact angle with respect to said coating which is less than the contact angle exhibited by the respective molten alkali metals with respect to the material of the particles which underlies their coatings.

The invention extends also to a separator for a high temperature rechargeable electrochemical power storage cell having a molten alkali metal anode, the separator being a conductor of alkali metal ions having, on a surface thereof, a layer of particulate material which is electronically conductive and chemically inert to alkali metals and to the separator, and the particles thereof being coated by a surface coating, alkali metals when molten exhibiting a contact angle with respect to said coating which is less than the contact angle exhibited by the respective molten alkali metals with respect to the material of the particles which underlies their coatings.

The invention will now be described, by way of example, with reference to the accompanying diagrammatic drawings, in which.

Figure 1:
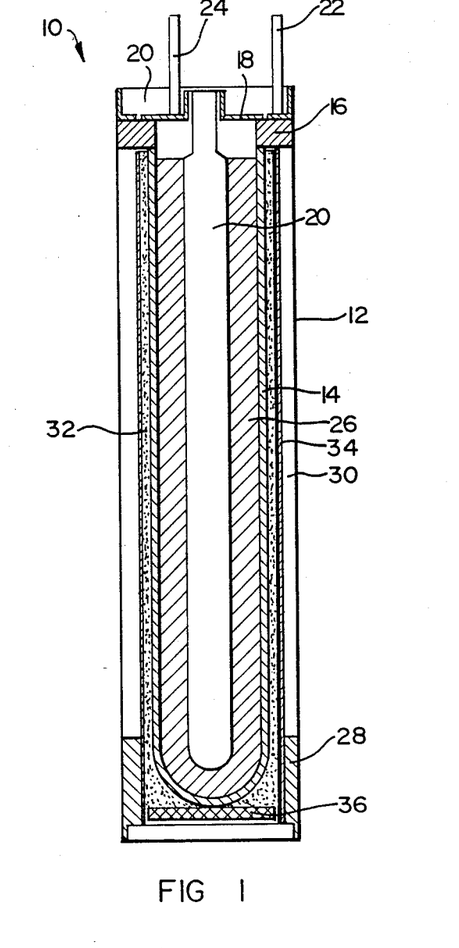
FIG. 1 shows a schematic sectional side elevation of an electrochemical cell in accordance with the invention.

Referring first to FIG. 1, the cell in accordance with the invention is generally designated by reference numeral 10. The cell 10 comprises an outer tubular steel cell housing 12, within which is concentrically located a beta-alumina tube 14 which is closed at one end and open at the other. In the drawing the cell is shown in an upright condition, with the closed end of the tube 14 lowermost, and its open end uppermost. Said open end is sealed by glass to an alpha-alumina ring 16 to which the housing 12 is also sealed by glass, to provide a sealed anode compartment between the tube 14 and housing 12.

The upper end of the tube 14 is closed off by an annular steel closure member 18, into the central opening of which is sealed a steel current collector 20 in the form of a bar or rod which extends downwardly concentrically into the tube 14, to a position closely spaced form its closed end.

The housing 12 extends upwardly over and past the outer curved surface of the ring 16, and is folded over on top of the ring 16 to provide a rim 21. An anode terminal post 22 of steel is fast with the floor of the rim 21 and a steel cathode terminal post 24 is fast with the closure 18.

A tubular cathode structure 26 is shown in the annular space between the current collector 20 and the inner surface of the tube 14. In the example shown this cathode structure is a porous iron matrix which is impregnated by liquid stoichiometrically exact $NaAlCl_4$ molten salt electrolyte, the matrix containing particulate solid NaCl dispersed therein, and, in its charged state, containing $FeCl_2$ dispersed therein. (Instead, if desired, a sulphur/sodium polysulphide cathode 26 can be employed).

The anode compartment, between the tube 14 and casing 12 is filled to a low level with molten sodium anode material 28, a gas space 30 under vacuum existing above the level of the sodium 28.

In accordance with the invention, the outer surface of the tube 14 is enclosed by a powder layer 32, whose composition will be described hereunder, the powder layer 32 being held in place by a porous steel sleeve in the form of a tube 34. The sleeve 34 is tubular and concentric with the tube 14, and the thickness of the powder layer is about 1 mm. The drawing is not strictly to scale, bearing in mind that the tube 14 has an internal diameter of about 30 mm and a length of about 230 mm. The lower end of the tube 34 is closed by a porous powder retainer or plug 36, porous to the molten sodium 28. The powder layer 32 is saturated with molten sodium, by capillary action. This capillary action is sufficient to draw molten sodium up through the powder layer 32, to the top of the powder layer 32 and tube 14, against gravity. Naturally, the pores of the sleeve 34 will be selected to be of a sufficiently small size, bearing in mind the size of the particles of the powder layer 32, or vice versa, so that the sleeve 34 effectively retains the particles of the layer 32 in position.

EXAMPLES

With a cell of the layout described above with reference to FIG. 1 of the drawings, various tests were conducted employing various powders. These powders included:

Type MH33025 iron powder available from Hoganas AB, Sweden, having 97% by mass of its particles less than 50 microns in size;

Type 123 nickel powder available from Inco Limited, Great Britain, and having an average particle size of about 3,7 microns;

Type 255 nickel powder available from Inco Limited, and having a particle size in the range 2,2-2,8 microns;

Type S1607 carbon powder available from Le Carbon, France, and having a particle size in the range 50–400 microns; and Mixtures of two or more of the aforegoing.

As coatings for the powders have been tested manganese nitrate, lead acetate, zinc chloride and ferric chloride, applied to the powders via an aqueous solution thereof followed by drying to leave the coating; and metallic zinc, tin and lead coatings, applied by electroplating of the powders form plating solutions of salts of these metals.

With regard to use of the coated powders in the cells according to FIG. 1, it should be noted that, at the operating temperatures of the cells in question, certain of the metal salt coatings can become converted to the metal oxide or the metal itself on contact with the molten sodium of the anode; and some of the metal coatings can become alloyed with or dissolve in the sodium of the anode. The powder of the wicking material nevertheless retains a coating which exhibits a contact angle with molten sodium of less than 10°, and which angle is less than the contact angle between molten sodium and the material of the powder itself, for enhanced wetting of the wicking material by sodium.

In each case a suitable getter was charged into the anode compartment, namely flake aluminium or magnesium powder.

These cells were operated, and were compared with controls, respectively in which the sodium was forced under pressure against the outside of the beta-alumina tube by pressurizing the node compartment and in which a game wick wrapped around the beta-alumina tube was employed.

Figure 2:
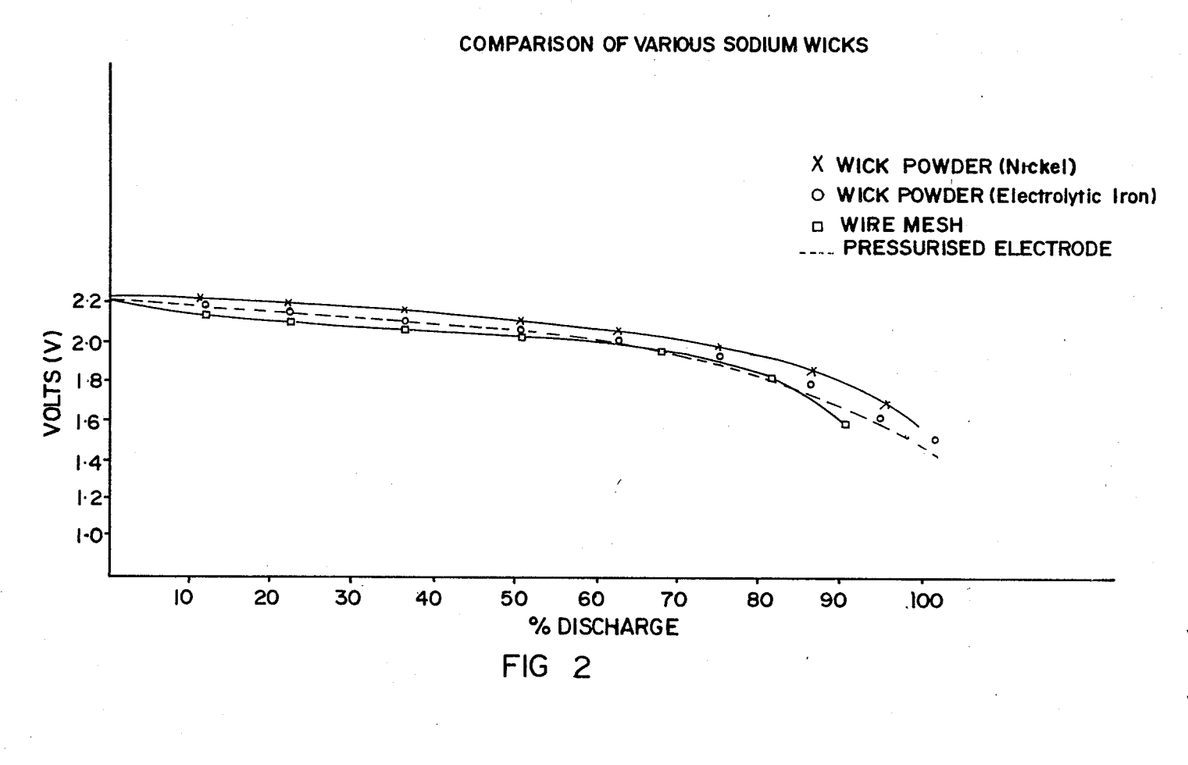
FIGS. 2 and 3 show, for the first discharge cycles of prototype cells in accordance with the invention and control cells, plots of cell voltage against percentage theoretical capacity.
Figure 3:
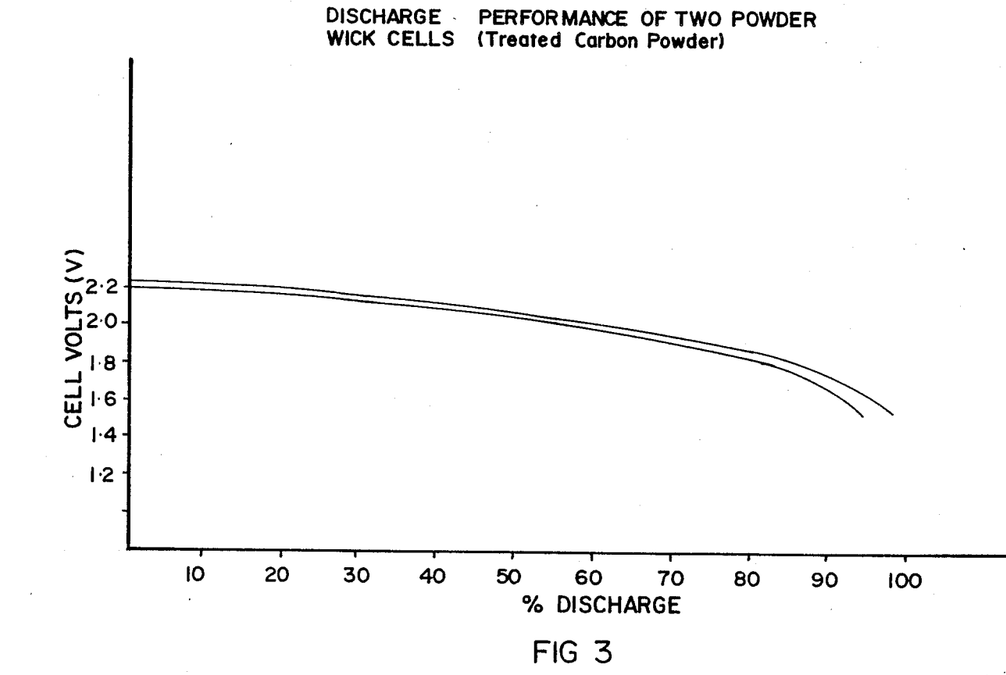

Results for the first discharge cycle in each case are shown in FIGS. 2 and 3, from which it emrges that the cell performance, and accordingly the wetting of the tubes by the sodium, when the powders were used, at least comparable with the controls, and in some cases better. In further tests conducted by the Applicant, successful tests were carried out on silicon carbide powders, coated in similar fashion, and zircon powders appeared to exhibit some promise.

In FIG. 2, the nickel and iron powder wicks according to the invention were coated with lead acetate and zinc chloride coatings respectively; and in FIG. 3, carbon powder wicks were coated with manganese nitrate coatings according to the invention.

Carbon powders coated with manganese nitrate coatings were found to be particularly promising (although it is difficult to predict which powders and coatings will eventually turn out to be the best), and further tests were conducted thereon. In these further tests cells according to FIG. 1 were again employed, but the porous steel sleeve or tube 34 was replaced by a porous aluminium tube. The aluminium tube 34 had an inside diameter of 34,2 mm and a wall thickness of 0,4 mm. The beta-alumina tube 14 had an outer diameter of 33 mm, so that the powder annulus 32 had a thickness of 0,6 mm. (In this regard it will be appreciated that the various wall thicknesses in FIG. 1 are not strictly to scale). About 36 of these cells have been tested to date and details of the performance of six of these are set forth in the following Table, and are plotted in FIGS. 4-6, for selected discharge cycles.

TABLE

| Cell No. | Cycle No. | Discharge Capacity as a % of Theoretical capacity |
| --- | --- | --- |
| 1 | 2nd | 98.4 |
| 2 | 8th | 98.6 |
| 3 | 2nd | 99.1 |
| 4 | 2nd | 99.0 |
| 5 | 2nd | 100.0 |
| 6 | 3rd | 98.7 |

Figure 4:
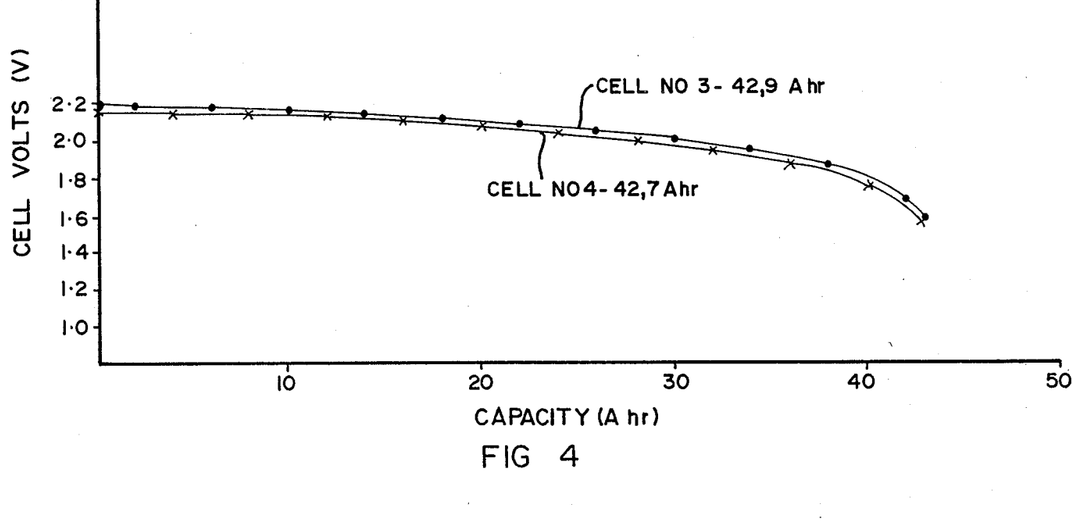
FIGS. 4 to 6 show, for selectted discharge cycles of subsequently tested cells employing the most promising powder wicks according to the invention, similar plots of cell voltage against cell capacity.
Figure 5:
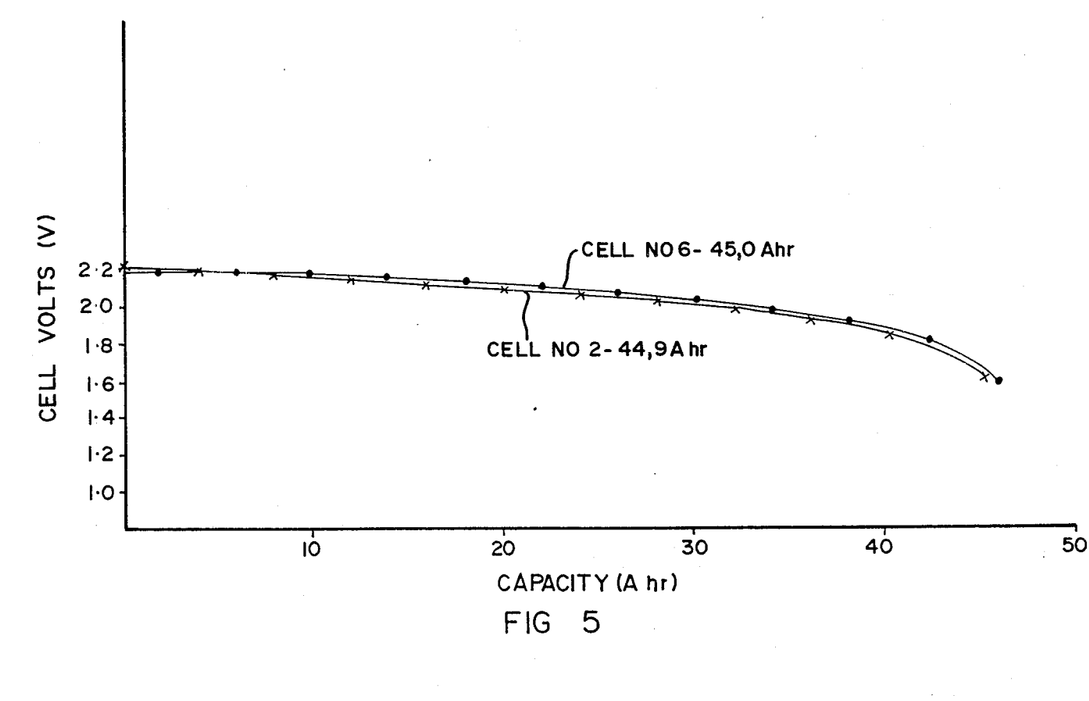
Figure 6:
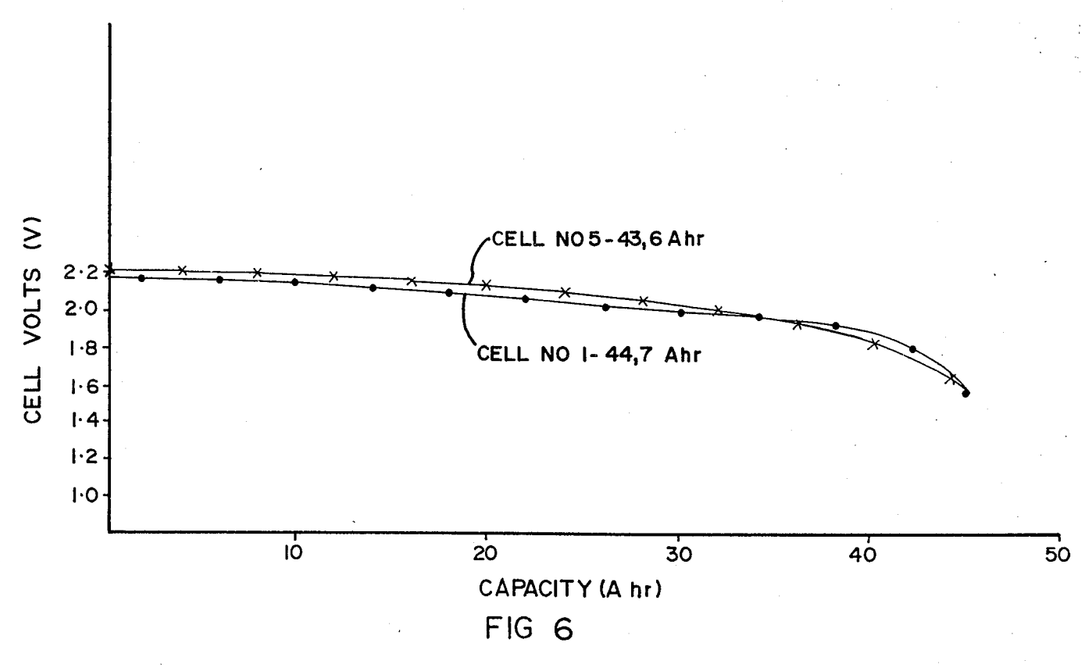

In FIGS. 4-6, results are shown for a discharge current of 8A and the absolute discharge capacities are shown, for the discharge cycles indicated in the Table.

With regard to the porous sleeve or tube 34, it should be noted that this can be replaced by a non-porous tube in substantially the same position. In this case, however, the porous retainer or plug 36 will extend across the full width of the housing 12, so that the non-porous tube will rest at its lower end on said retainer or plug. Sodium at 28 can thus pass into or out of the powder layer 32, by passing through said retainer or plug, under the lower end of said sleeve or tube. It is an advantage of the invention that it provides a cell construction which leads to easily applied and reliable wetting of the outer surface of the beta-alumina tube, particularly at low temperatures by sodium. To provide the powder layer on the outside of the beta-alumina tube, it is sufficient merely to pour the powder into place within the gauze sleeve, and tamp it into position. The powder particles automatically engage the outside of the beta-alumina tube at a plurality of regularly and closely spaced positions, allowing capillarity to cause the sodium to engage the beta-alumina tube over substantially its full surface. This is to be contrasted with e.g. gauze wicks, which even if they are tightly wrapped around the beta-alumina tube, leave spaces which are not engaged by the wick, and which are not necessarily wetted by sodium after operation for substantial periods at low temperatures.

Finally, it should be noted that an easy way of determining whether or not a surface coating for the particles of the layer in fact is such that the molten alkali metal of the anode exhibits a contact angle with respect thereto which is less than the contact angle exhibited by the molten alkali metal with respect to the material underlying the particle coatings, is by comparing the wicking ability of packed columns of the uncoated and coated particles. Thus e.g. suitable glass tubes can be packed respectively with coated and uncoated particles, and can be arranged vertically with their lower ends dipping in molten alkali metal. To meet the requirements of the present invention, the coated particles must wick the alkali metal upwardly in the associated glass tube to a greater height than the uncoated particles.

We claim:

1. A high temperature rechargeable electrochemical power storage cell which comprises an alkali metal anode which is molten at the operating temperature of the cell, a cathode and a separator which separates the anode from the cathode and which is a conductor of ions of the metal of the anode, the surface of the separator which is exposed to the anode being at least partly enclosed by and in contact with a layer of particulate material which acts as a wick for the molten alkali metal of the anode, the material of the particles of the layer being electronically conductive and chemically inert at the cell operating temperatures to the alkali metal of the anode and to the separator, and the particles thereof being coated by a surface coating, the alkali metal of the anode when molten exhibiting a contact angle respect to said coating which is less than the contact angle exhibited by the molten alkali metal with respect to the material of the particles which underlies their coatings, and the coatings being of a metal oxide selected from the group consisting of the oxides of lead, tin, zinc, copper, iron, nickel, manganese and mixtures thereof.

2. A high temperature rechargeable electrochemical power storage cell which comprises an alkali metal anode which is molten at the operating temperature of the cell, a cathode and a separator which separates the anode from the cathode and which is a conductor of ions of the metal of the anode, the surface of the separator which is exposed to the anode being at least partly enclosed by and in contact with a layerof particulate material which acts as a wick for the molten alkali metal of the anode, the material of the particles of the layer being electronically conductive and chemically inert at the cell operating temperatures to the alkali metal of the anode and to the separator, and the particles of the layer being coated by a surface coating, the alkali metal of the anode when molten exhibiting a contact angle with respect to said coating which is less than the contact angle exhibited by the molten alkali metal with respect to the material of the particles which underlies their coatings, and the coatings being reduced metal oxide coatings.

3. A cell as claimed in claim 1 or in claim 1 or in claim 2, in which the layer has a thickness of 0.5-2 mm, and the particulate material has an average particle size in the range 2-400 microns.

4. A cell as claimed in claim 1 or claim 2, in which the material of the particles underlying their coatings is a member of the group consisting of metals which are more noble than the alkali metal of the anode, graphite, silicon carbide, and mixtures thereof.

5. A cell as claimed in claim 1 or claim 2, in which the cell contains, in contact with or dissolved in the alkali metal of the anode, a getter selected from the group consisting of aluminium, titanium, vanadium, magnesium and mixtures thereof.

6. A cell as claimed in claim 1 or claim 2, in which the alkali metal of the anode is sodium and the separator is of beta-alumina.

7. A cell as claimed in claim 7 or claim 2, in which the cathode has as its active cathode substance, a substance selected from sulphur/sodium sulphide/polysulphide and members of the group consisting of $Fe/FeCl_2$, $Ni/NiCl_2$, $Cr/CrCl_2$ and $Mn/MnCl_2$, immersed in a $NaAlCl_4$ molten salt electrolyte in contact with the separator and in which the mole ratio of Al:Na ions is at most 1:1.

8. A cell sub-assembly for a high temperature rechargeable electrochemical power storage cell, which sub-assembly comprises a cell housing and a separator which divides the housing into an anode compartment and a cathode compartment, the separator being a conductor of alkali metal ions and having, on its surface exposed to the anode compartment, a layer of particulate material which is electronically conductive and chemically insert at the operating temperatures of such cells to alkali metals and to the separator, and the particles of the layer being coated by a surface coating, alkali metals when molten exhibiting a contact angle with respect to said coating which is less than the contact angle exhibited by the respective molten alkali metals with respect to the material of the particles which underlies their coatings, and the coatings being of a metal oxide selected from the group consisting of the oxides of lead, tin, zinc, copper, iron, manganese and mixtures thereof.

9. A separator for a high temperature rechargeable electrochemical power storage cell having a molten alkali metal anode, the separator being a conductor of alkali metal ions and having, on a surface thereof, a layer of particulate material which is electronically conductive and chemically inert at the operating temperatures of such cells to alkali metals and to the separator, and the particles of the layer being coated by a surface coating, alkali metals when molten exhibiting a contact angle with respect to said coating which is less than the contact angle exhibited by the respective molten alkali metals with respect to the material of the particles which underlies their coatings,and the coatings being of a metal oxide selected from the group consisting of the oxides of lead, tin, zinc, copper, iron, manganese and mixtures thereof.

10. A cell sub-assembly for a high temperature rechargeable electrochemical power storage cell, which sub-assembly comprises a cell housing and a separator which divides the housing into an anode compartment and a cathode compartment, the separator being a conductor of alkali metal ions and having, on its surface exposed to the anode compartment, a layer of particulate material which is electronically conductive and chemically inert at the operating temperatures of such cells to alkali metals and to the separator, and the particles of the layer being coated by a surface coating, alkali metals when molten exhibiting a contact angle with respect to said coating which is less than the contact angle exhibited by the respective molten alkali metals with respect to the material of the particles which underlies their coatings, and the coatings being reduced metal oxide coatings.

11. A separator for a high temperature rechargeable electrochemical power storage cell having a molten alkali metal anode, the separator being a conductor of alkali metal ions and having, on a surface thereof, a layer of particulate material which is electronically conductive and chemically inert at the operating temperatures of such cells to alkali metals and to the separator, and the particles of the layer being coated by a surface coating, alkali metals when molten exhibiting a contact angle with respect to said coating which is less than the contact angle exhibited by the respective molten alkali metals with respect to the material of the particles which underlies their coatings, and the coatings being reduced metal oxide coatings.

* * * * *

UNITED STATES PATENT AND TRADEMARK OFFICE
CERTIFICATE OF CORRECTION

PATENT NO. : 4,910,105

DATED : March 20, 1990

INVENTOR(S) : Alec R. Tilley, et al

It is certified that error appears in the above-identified patent and that said Letters Patent is hereby corrected as shown below:

In claim 2, column 7, line 22, change "layerof" to --layer of--.

In claim 3, column 7, line 35, delete "or in claim 1".

In claim 7, column 7, line 52, change "claim 7" to --claim 6--.

In claim 8, column 8, line 5, change "insert" to --inert--.

Signed and Sealed this

Sixteenth Day of July, 1991

Attest:

HARRY F. MANBECK, JR.

Attesting Officer

Commissioner of Patents and Trademarks